US 011474075B2

(12) United States Patent
Lepage et al.

(10) Patent No.: US 11,474,075 B2
(45) Date of Patent: Oct. 18, 2022

(54) TOTAL FOCUSING METHOD (TFM) WITH ACOUSTIC PATH FILTERING

(71) Applicant: Olympus NDT Canada Inc., Québec (CA)

(72) Inventors: Benoit Lepage, L'Ancienne-Lorette (CA); Guillaume Painchaud-April, L'Ancienne-Lorette (CA)

(73) Assignee: Olympus NDT Canada Inc., Québec (CA)

( * ) Notice: Subject to any disclaimer, the term of this patent is extended or adjusted under 35 U.S.C. 154(b) by 231 days.

(21) Appl. No.: 16/836,211

(22) Filed: Mar. 31, 2020

(65) Prior Publication Data
US 2021/0132004 A1    May 6, 2021

Related U.S. Application Data

(60) Provisional application No. 62/927,787, filed on Oct. 30, 2019.

(51) Int. Cl.
*G01N 29/06* (2006.01)
*G01N 29/24* (2006.01)

(52) U.S. Cl.
CPC ..... *G01N 29/0654* (2013.01); *G01N 29/2437* (2013.01); *G01N 2291/0231* (2013.01);
(Continued)

(58) Field of Classification Search
CPC .......... G01N 29/0654; G01N 29/2437; G01N 29/262; G01N 29/40; G01N 2291/0231;
(Continued)

(56) References Cited

U.S. PATENT DOCUMENTS 6,264,610 B1 * 7/2001 Zhu ...................... A61B 5/0091
600/443
2020/0402262 A1 * 12/2020 Wrinch ................. E21B 47/107

FOREIGN PATENT DOCUMENTS

WO    WO-2006113445 A1    10/2006
WO    WO-2015089667 A1    6/2015

OTHER PUBLICATIONS

Bottenus, Nick, "Comparison of virtual source synthetic aperture beamforming with an element-based modela)", J Acoust Soc Am. 143(5), (2018), 2801-2812.

(Continued)

*Primary Examiner* — Tarun Sinha
(74) *Attorney, Agent, or Firm* — Schwegman Lundberg & Woessner, P.A.

(57) ABSTRACT

An acoustic technique can be used for performing nondestructive testing. For example, a method for acoustic evaluation of a target can include generating respective acoustic transmission events via selected transmitting ones of a plurality of electroacoustic transducers, and in response to the respective acoustic transmission events, receiving respective acoustic echo signals using other receiving ones of the plurality of electroacoustic transducers, and coherently summing representations of the respective received acoustic echo signals to generate a pixel or voxel value corresponding to a specified spatial location of the target. Such summation can include weighting contributions from the respective representations to suppress contributions from acoustic propagation paths outside a specified angular range with respect to a surface on or within the target, such as to provide an acoustic path-filtered total focusing method (PF-TFM).

20 Claims, 16 Drawing Sheets

(52) U.S. Cl.
CPC ............... *G01N 2291/0289* (2013.01); *G01N 2291/044* (2013.01); *G01N 2291/106* (2013.01)

(58) Field of Classification Search
CPC ..... G01N 2291/0289; G01N 2291/044; G01N 2291/106
See application file for complete search history.

(56) References Cited

OTHER PUBLICATIONS

Duxbury, D, "Calibration and Control of Advanced Ultrasonic Array Technology (PhD Thesis)", Imperial College London, [Online]. Retrieved from the Internet: <URL: https://www.imperial.ac.uk/media/imperial-college/research-centres-and-groups/non-destructive-evaluation/Duxbury-D-2013-PhD-Thesis.pdf>, (2013), 202 pgs.

Kwan, C-H, et al., "TFM Acoustic Influence Map", Quality Magazine, [Online]. Retrieved from the Internet: <URL: https://www.qualitymag.com/articles/95924-tfm-acoustic-influence-map>, (Feb. 8, 2020), 16 pgs.

Le Jeune, Leonard, et al., "Adaptive Ultrasonic Imaging with the Total Focusing Method for Inspection of Complex Components Immersed in Water", QNDE Conference, (2014).

Long, R, et al., "Improved Phased Array Mode Conversion Inspections Using Variable Split Aperture Processing", [Online]. Retrieved from the Internet: <URL: https://www.ndt.net/article/jrc-nde2010/papers/80.pdf>, (2010), 8 pgs.

Trots, I, et al., "Synthetic Aperture Method in Ultrasound Imaging", InTech, [Online], Retrieved from the Internet: <URL: http://www.intechopen.com/books/ultrasound-imaging/synthetic-aperture-method-inultrasound-imaging>, (Apr. 2011), 37-57.

"International Application Serial No. PCT/CA2020/051449, International Search Report dated Jan. 11, 2021", 3 pgs.

"International Application Serial No. PCT/CA2020/051449, Written Opinion dated Jan. 11, 2021", 3 pgs.

"European Application Serial No. 20882825.1, Extended European Search Report dated Aug. 23, 2022", 6 pgs.

Chen, Yao, et al., "Research of SNR enhancement for coarse-grained CASS based on phase coherence imaging", IEEE Far East NDT New Technology & Application Forum (FENDT), (2016), 44-48.

Sternini, Simone, et al., "Ultrasonic imaging using wave structure-based weights and global matched coefficients", Proc. of SPIE, vol. 9805, (2016), 16 pgs.

Zhou, Xiang, et al., "Effects of directivity funtion on total focusing method imaging performance", IEEE Far East Forum on Nondestructive Evaluation/Testing, (2014), 57-60.

\* cited by examiner

TOTAL FOCUSING METHOD (TFM) WITH ACOUSTIC PATH FILTERING

CLAIM OF PRIORITY

This patent application claims the benefit of priority of Lepage et al., U.S. Provisional Patent Application Ser. No. 62/927,787, titled "ACOUSTIC PATH FILTERING FOR IMPROVED MULTIMODE TOTAL FOCUSING METHOD INSPECTION," filed on Oct. 30, 2019, which is hereby incorporated by reference herein in its entirety.

FIELD OF THE DISCLOSURE

This document pertains generally, but not by way of limitation, to non-destructive evaluation using acoustic techniques, and more particularly to improved focusing techniques for phased-array ultrasound inspection.

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures. Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

SUMMARY OF THE DISCLOSURE

As mentioned above, acoustic techniques can be used to perform non-destructive testing (sometimes referred to generally as non-destructive evaluation) of structures by coupling acoustic energy onto or within such structures and detecting scattered or reflected energy corresponding to features on or within such structures under test.

In one approach, a plurality of acoustic transducers can be used to perform such acoustic inspection. Such a plurality of transducers can be referred to as an "array," but such an array need not be planar or linear in arrangement or orientation, and need not have a constant pitch between respective transducer elements.

Processing of received acoustic echo signals to form images can involve various techniques. In one approach, respective received acoustic echo signals can be "delayed and summed" to provide focusing within a specific locus on or within the structure under test. Such an approach can present challenges because the focal region is spatially limited in extent. In another approach, a technique called a "total focusing method" (TFM) can be used, such as involving a full-matrix capture (FMC) acquisition scheme where focus can be achieved across a broad spatial region on or within a structure under test. The techniques mentioned above can still present challenges. For example, various standards for inspection of structures such as pipeline welds may place a burden on inspectors to explain features displayed in inspection images, even if such features are artifacts (e.g., non-physical or incorrect in displayed location or extent). Such artifacts can be generated by conventional delay-and-sum or TFM techniques when multiple acoustic propagation modes contribute to the transmitted or received signals in an unwanted manner.

In one approach, artifacts may be suppressed by physically limiting a beam aperture (e.g., "direct" control of mode excitation or coupling), but such an approach has drawbacks. For example, limiting of the beam aperture may undesirably constrain the inspection to being performed using only certain acoustic propagation modes. For example, physically limiting the beam aperture may preclude being able to scan using intentional mode conversion, such as in a self-tandem weld or crack inspection scheme where longitudinal-to-transverse mode conversion is desired along the propagation path. Use of a limited beam aperture may also generally limit the sharpness of focusing, because a wider beam aperture generally allows resolution of finer features within the structure under test.

To address one or more challenges mentioned above, the present inventors have recognized, among other things, that an FMC acquisition technique can be used in combination with an improved TFM approach including a path-filtering technique ("PF-TFM"). In a path-filtering approach, gain modulation is applied to signals corresponding to individual propagation paths (including transmit path, receive path, or both transmit path and receive path). Modulation of gain can be performed according to a desired propagation mode, such as on a path-by-path basis with regard to a particular pixel or voxel. Use of the phrase "pixel" or "voxel" in relation to imaging as described herein are non-limiting in the sense that the techniques described herein are generally applicable to reconstruction of two-dimensional images or three-dimensional imaging data, as illustrative examples.

Empirical results using the PF-TFM techniques described herein show considerable improvement of the signal-to-noise ratio (SNR) versus techniques lacking the path-filtering approach. Experimentally-obtained results show PF-TFM suppressing or eliminating signals originating from undesired acoustic propagation paths. For example, PF-TFM imaging generated on a deep vertical crack emanating from the back wall of a steel structure under test shows a median 23-decibel SNR improvement in suppression of unwanted mode conversion artifacts with negligible consequences to the useful signals for selected transverse-wave (T-wave) inspection paths (e.g., TT, TT-TT and TT-T).

In an example, a technique, such as a computer-implement or otherwise automated method can include acoustic evaluation of a target, the technique including generating respective acoustic transmission events via selected transmitting ones of a plurality of electroacoustic transducers. In response to the respective acoustic transmission events, the technique can include receiving respective acoustic echo signals using other receiving ones of the plurality of electroacoustic transducers and coherently summing representations of the respective received acoustic echo signals to generate a pixel or voxel value corresponding to a specified spatial location of the target, including weighting contributions from the respective representations to suppress contributions from acoustic propagation paths outside a specified angular range with respect to a surface on or within the target. The weighting the contributions can include suppressing contributions corresponding to an undesired acoustic propagation mode within a medium defined by the target, or enhancing a contribution corresponding to a specified (e.g., desired) acoustic propagation mode within the medium, including applying a corresponding window function providing a value that is dependent on the angular relationship.

In an example, an apparatus, such as a portion or an entirety of an inspection system, can include a processor circuit, and a memory circuit comprising instructions that, when executed by the processor circuit, cause the system to generate respective acoustic transmission events via selected transmitting ones of a plurality of electroacoustic transducers, in response to the respective acoustic transmission events, receive respective acoustic echo signals using other receiving ones of the plurality of electroacoustic transducers, coherently sum representations of the respective received acoustic echo signals to generate a pixel or voxel value corresponding to a specified spatial location of the target, including weighting contributions from the respective representations to suppress contributions from acoustic propagation paths outside a specified angular range with respect to a surface on or within the target, generate an image using a plurality of pixel or voxel values corresponding to respective specified spatial locations of the target and transmit or present the generated image to a user. The apparatus can include or can be electrically coupled to an electroacoustic transducer assembly, such as comprising a plurality of electroacoustic transducers for one or more of transmitting or receiving acoustic energy in response to instructions executed by the processor circuit.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various implementations discussed in the present document.

DETAILED DESCRIPTION

Figure 1:
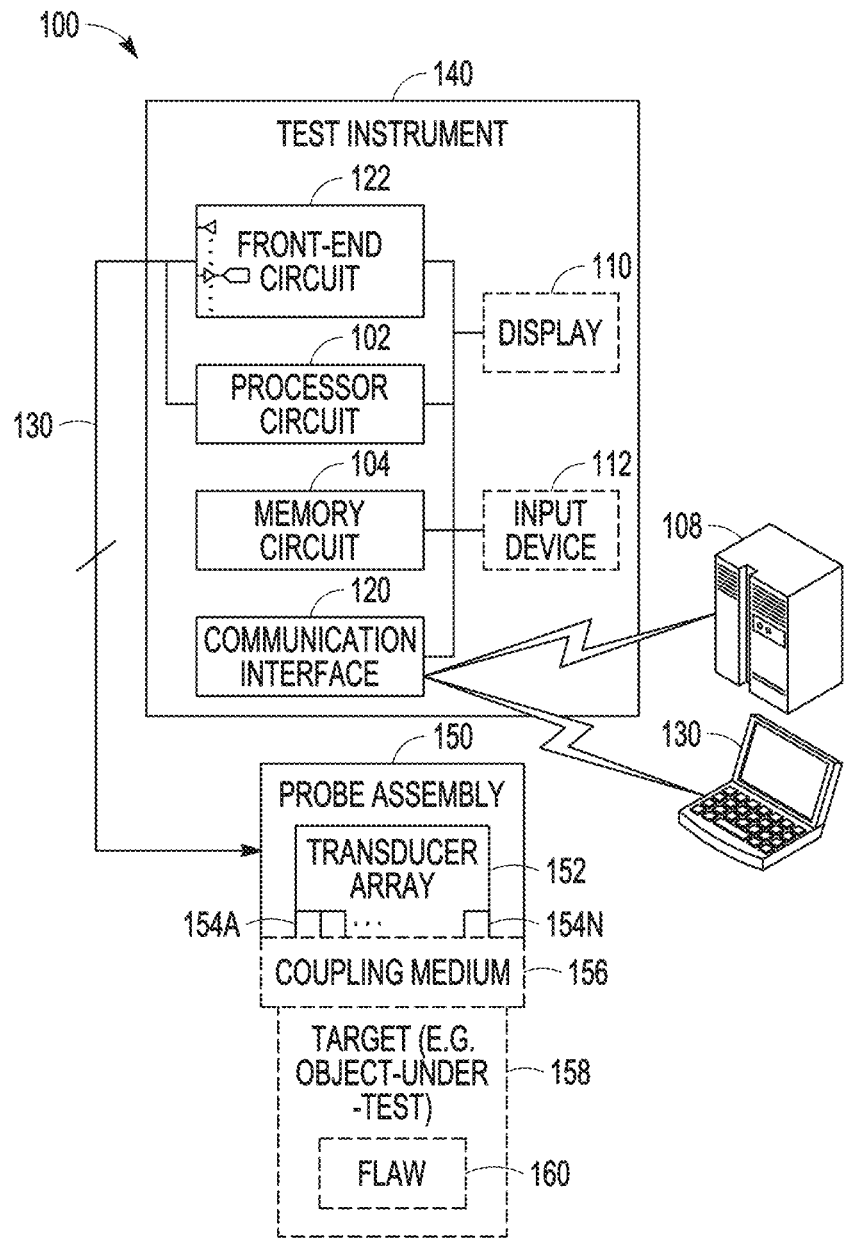
FIG. 1 illustrates generally an example comprising an acoustic inspection system, such as can be used to perform one or more techniques showed and described elsewhere herein.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour, or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement, and may be performed upon initial fabrication or on a recurring basis for ongoing surveillance, as illustrative examples.

The receive signal chain of the front end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as a-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2A:
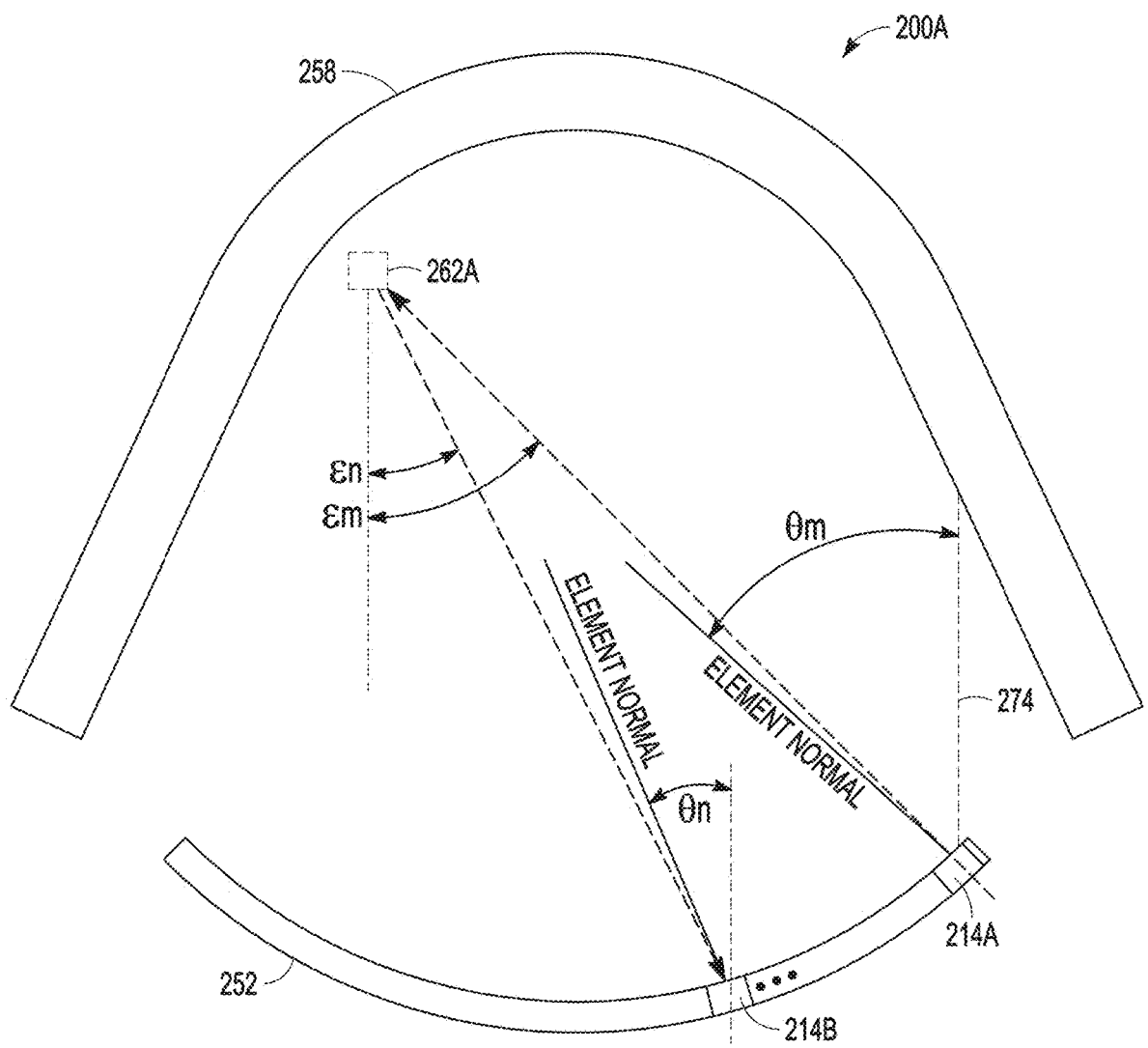
FIG. 2A illustrates generally an example comprising an acoustic inspection configuration where gain apodization can be used in generating an image using a Total Focusing Method (TFM) approach.

FIG. 2A illustrates generally an example 200A comprising an acoustic inspection configuration where gain apodization can be used in generating an image using a Total Focusing Method (TFM) approach. In the examples in this document, data is acquired using a full-matrix capture (FMC) technique, though the techniques for TFM processing described herein are also believed applicable to data acquisition performed using a virtual source approach. Generally, in an FMC approach, acoustic transmission events occur where each element in a transducer array 252 generates an acoustic pulse while the other elements in array receive echo signals (reflections or scattered acoustic energy) elicited in response to the acoustic transmission. An FMC matrix is defined first in two axes where a first axes corresponds to each transmit event, and a second axis corresponds to each receiving location. Each element in the FMC matrix comprises time-series data (e.g., an elementary "A-line") corresponding to a particular receiving location and a corresponding transmit event. Generally, each element in the FMC matrix has a one-to-one relationship with electroacoustic transducer elements in the transducer array 252, but such a one-to-one relationship is not required. In another approach, groups of elements can be used for transmission during individual transmission events and groups of elements can be used for receiving during the receive events, such as to provide desired transmission or receive apertures or transmit-receive combinations.

To construct an image of a particular location (e.g., a pixel or voxel location in the imaging data), generally, contributions from signals received at each transducer element in response to each transmission event are summed, including selecting appropriate samples from the corresponding A-lines corresponding to the spatial location (and related propagation path) of the pixel or voxel. The A-line data can include real-valued time-series information or analytic form. Because the propagation path influences that summation for each voxel or pixel, filtering or modulation of signals can be performed in response to one or more characteristics of the propagation path, such as by weighting particular terms in the summation using knowledge of the propagation path. A generalized representation of the summation corresponding to a particular voxel location in three dimensions can be represented as shown below in EQN. (1):

$$\text{TFMvoxel}(x,y,z) = \Sigma_{m=1}^{M} \Sigma_{n=1}^{N} W_n(x,y,z) W_m(x,y,z) S_{mn}(x,y,z) \quad (1)$$

In the equation above, a count of N transmitting events (e.g., N transmitting elements) is used, a count of M receiving elements is used, and weighting function $W_n$ and $W_m$ are used, for transmission path weighting and receive path weighting, respectively, operating on sample $S_{mn}$. As mentioned above $S_{mn}$ can be a sample or other representation extracted from a time-series of real-valued samples or analytic form time-series (e.g., lacking negative frequency components in the frequency domain in the latter case). The techniques described in this document are generally applicable to two or three-dimensional coordinate systems, though the examples below target angle-beam inspection techniques in a two-dimensional coordinate frame (with the coordinate frame being defined in the drawings as z-axis vertical, y-axis horizontal, and x-axis extending in the depth dimension into the page).

Referring to the configuration of FIG. 2A, a target 258, such as a composite material can be imaged using a curved transducer array 252. Imaging of a particular pixel or voxel location 262A can be performed using a summation of received pulse echo signals as described generically above. In one approach, transmit and receive gain apodization functions can be defined relative to a reference axis 274 (e.g., to provide transmit or receive directivity weighting). For example, EQN (2) below shows use of gain apodization relative to the transducer element normal (e.g., relative to a line perpendicular to a face of the receive or transmit transducer):

$$\text{TFMvoxel} = \Sigma_{m=1}^{M} \Sigma_{n=1}^{N} g_m(\theta_m, \varepsilon_m, T) g_n(\theta_n, \varepsilon_n, T) \hat{s}_{mn}(\tau_m + \Sigma_n) \quad (2)$$

In EQN. 2, $g_m$ can represent a gain apodization (e.g., weighting function) for the transmit beam, as a function of beam angle $\varepsilon_m$ defined relative to a reference axis (dashed line), and element normal angle, $\theta m$, as compared to another reference axis 274. Similarly, the receive gain apodization weighting $g_n$ is defined using angles $\theta_n$ and $\varepsilon_n$ as shown in FIG. 2A. An analytical function can be used to define the apodization gain functions, as discussed elsewhere herein. For example, T can be an angular range setting parameter, with a gain apodization window being defined according to an analytical expression as shown below in EQN. 3:

$$g(\theta, \varepsilon, T) \triangleq \left\{ \begin{array}{l} 0.5 + 0.5 \cos\left(\pi + \frac{\pi * |\theta - \varepsilon|}{T}\right) \\ 0, |\theta - \varepsilon| > T \end{array} \right\} \quad (3)$$

In the illustration of FIG. 2A, the pixel or voxel location 262A may be within the angular range for both the transmission beam axis from the transmitting element 214A and the receiving beam axis from the receiving element 214B. Accordingly, depending on the parameter T, a contribution in the captured signal matrix corresponding to the pixel or voxel location 262A would not be suppressed by the gain apodization functions $g_m$ and $g_n$ during TFM summation if within the "pass range" of the apodization window.

Figure 2B:
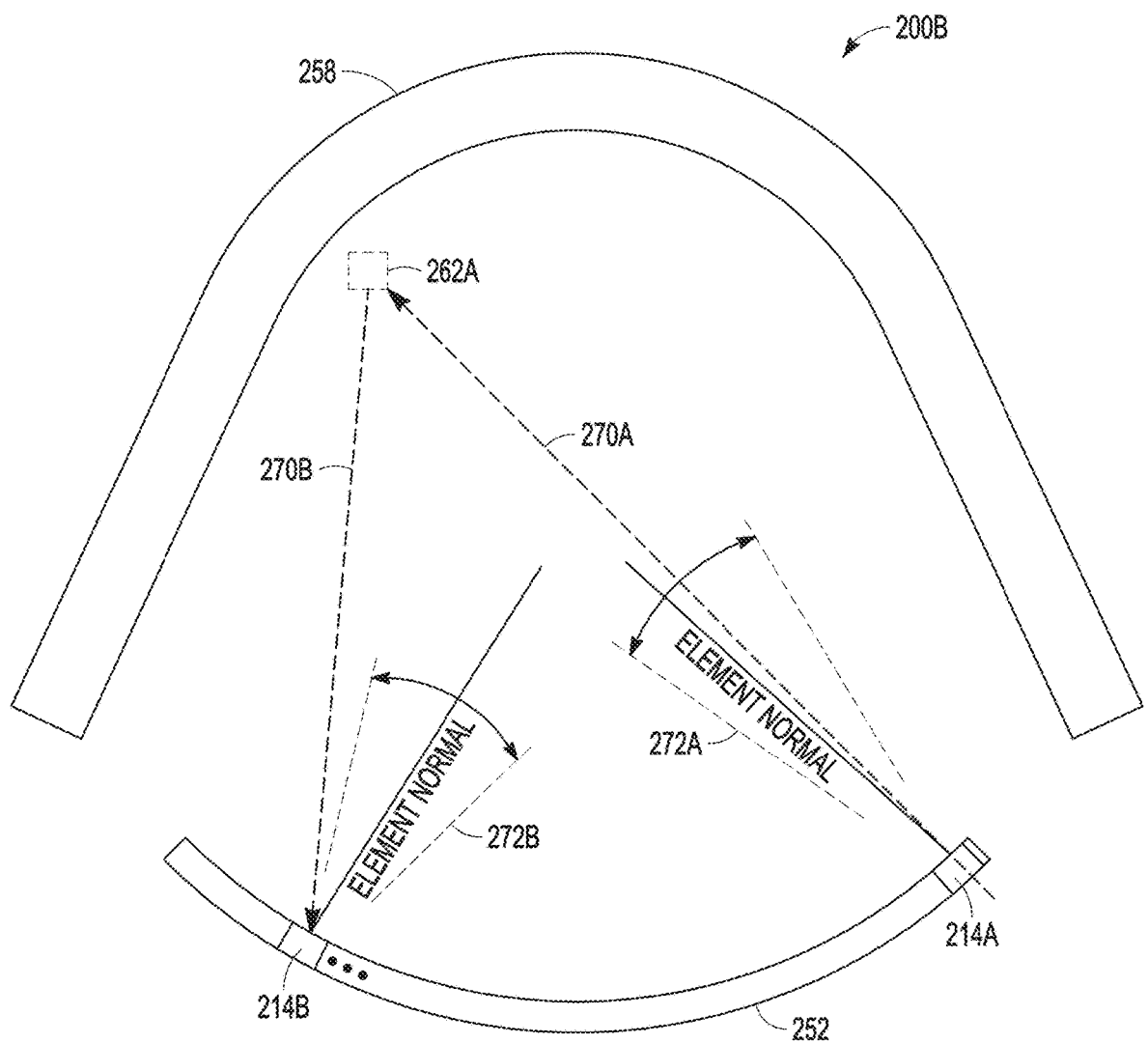
FIG. 2B illustrates generally an example comprising an acoustic inspection configuration where gain apodization can be used in generating an image using a Total Focusing Method (TFM) approach, similarly to FIG. 2A, but where a received acoustic signal is suppressed because the received signal is outside the reception gain apodization angular window.

As discussed elsewhere herein, the present inventors have recognized that other portions of the acoustic propagation paths can be used to implement gain modulation or weighting. By contrast, FIG. 2B illustrates generally an example 200B comprising an acoustic inspection configuration again including the transducer array 252 and target 258, but where a received acoustic signal is suppressed in the TFM summation because the received signal is outside the reception gain apodization angular window. In FIG. 2B, the pixel or voxel location 262A is insonified along a transmit axis 270A provided by transducer 214A, and the transmit axis 270A is within a representation 272A of the transmit gain apodization window $g_m$. However, the particular receive element 214B shown in FIG. 2B has a receive axis 270B cast from the pixel or voxel location 262A that is outside the receive gain apodization angular window 272B (in this case defined with respect to the receive element normal axis).

In the examples of FIG. 2A and FIG. 2B, the gain apodization (e.g., weighting) is performed relative to the acoustic transducer element, such as relative to the element normal axis. These weightings could also be performed relative to some other reference axis such as a tangent or reference plane defined by the element face. The present inventors have recognized, among other things, that in the TFM sum, the weighting can include a path filtering approach to suppress contributions from acoustic propagation paths outside a specified angular range with respect to a surface on or within the target 258, in addition to weighting relative to the transducer elements (e.g., element directivity weighting) or instead of weighting relative to the transducer elements. For example, FIG. 2C illustrates generally an example comprising an acoustic inspection configuration where gain apodization and acoustic path filtering can be used in generating an image using a Path-Filtering Total Focusing Method (PF-TFM) approach.

As in the example of FIG. 2A and FIG. 2B, a target 258 can be inspected using a transducer array 252. In FIG. 2C, a pixel or voxel location 262B within the target can be used to define an acoustic transmission path 270C including the surface of the target, and an acoustic receive path 270B. The transmission path 270C includes a transmit axis cast from the transmitting transducer element 214A to the surface of the target 258, and the receive path 270B includes a receive axis cast from the surface of the target 258 to the receiving transducer element 214B. In addition to, or instead of the examples of FIG. 2A and FIG. 2B, in FIG. 2C, gain modulation can be performed by applying one or more of a transmit angular range window 276A or a receive angular range window 276B defined with respect to the target rather than defined with respect to the transducer element (or both). That is, gain modulation can be performed to provide element directivity weighting as shown in FIG. 2A and FIG. 2B, and either alone or in combination with element directivity weighting, separate gain modulation (e.g., weighting) can be performed in relation to surface passage from the perspective of the target as shown generally in FIG. 2C and other examples herein.

Figure 2C:
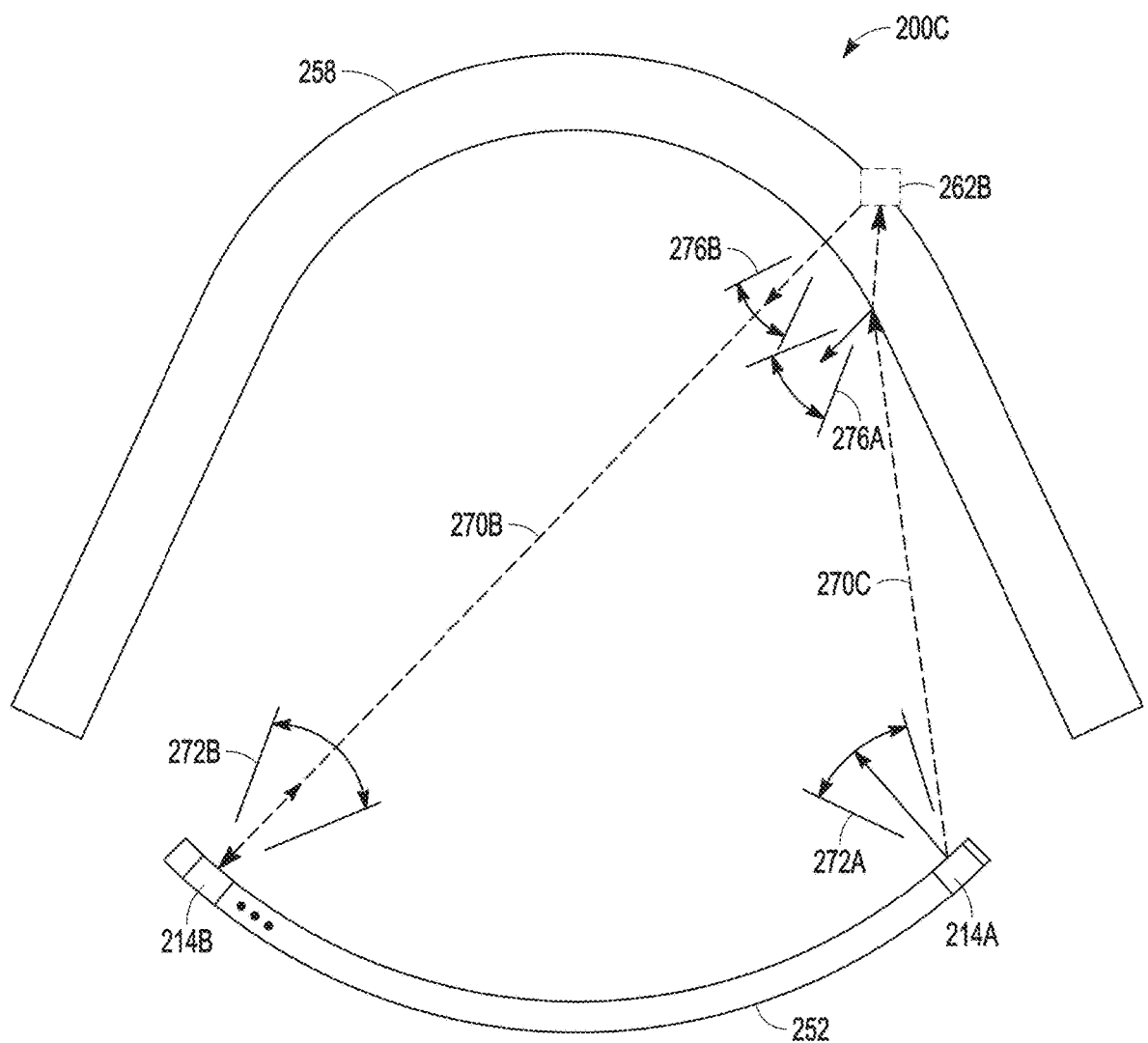
FIG. 2C illustrates generally an example comprising an acoustic inspection configuration where gain apodization and acoustic path filtering can be used in generating an image using a Path-Filtering Total Focusing Method (PF-TFM) approach.

For example, in the illustration of FIG. 2C, the transmit and receive angular range windows 276A and 276B are defined with respect to respective axes normal (e.g., perpendicular) to the target surface 258. Use of a target surface normal extending outward is somewhat arbitrary, and other axes can be used to define the transmit and receive angular range windows 276A and 276B (for example, a tangent axis or an axis extending inward from the surface of the target 258). In the example of the pixel or voxel location 262B shown in FIG. 2C, the transmit axis 270C falls outside the angular range window 276A and the transmit apodization window representation 272A and would therefore be suppressed in the TFM summation. By contrast, the receive axis 270B falls within both the receive angular range window 276B and receive apodization window representation 272B, and would otherwise have contributed to the TFM summation. In this manner, FIG. 2A, FIG. 2B, and FIG. 2C illustrate generally that acoustic path filtering can include weighting, such as using a specified angular range, defined relative to the transducer or relative to the target, in either or both of the transmit or receive acoustic signal paths. Use of such weighting can suppress artifacts that would otherwise appear in resulting imaging, such as due to grating effects or off-axis contributions to a received signal at a particular element. As discussed below in angle-beam inspection schemes, the path filtering scheme can be used to provide mode-selective TFM imaging.

In some test schemes, a geometry of the transducer array and target and their relative position may be known a priori, allowing the angular windows relative to the target to be defined in advance either analytically or in some other form (e.g., a look-up table or other arrangement). If the target surface is unknown, a hypothetical target representation can be used to establish the angular windows used for acoustic path filtering relative to the target. In yet another approach, an edge of the target can be detected using pulse-echo imaging or other techniques, such as using the same transducer array as is used for acquiring the received signals used for TFM summation.

Figure 3A:
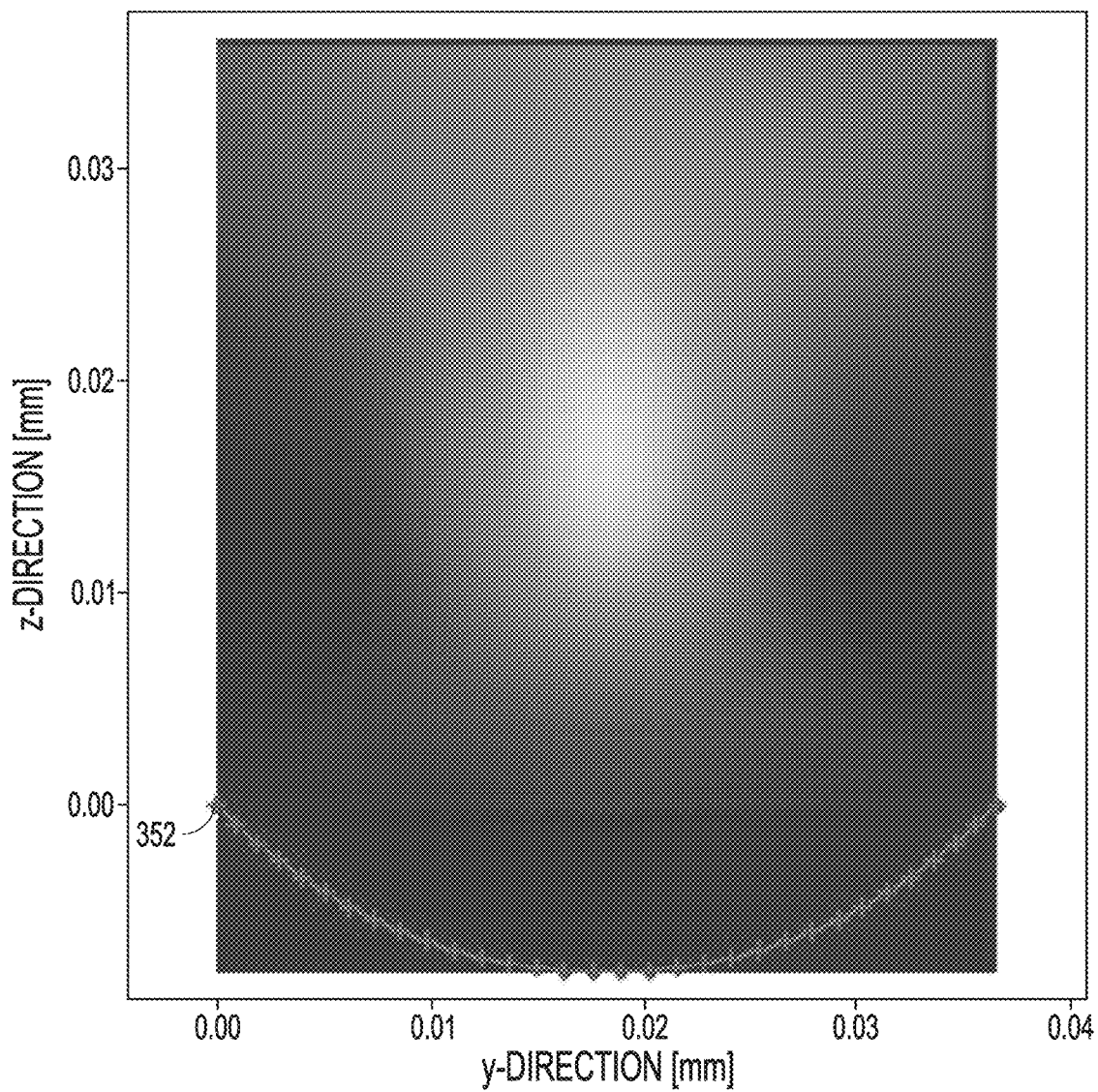
FIG. 3A illustrates generally an example comprising an level map encompassing a region within the coupling medium that can be generated for normalizing or scaling received acoustic signals according to a physical focusing behavior or gain apodization applied to the transducer array, and such as can be applied as a portion of the PF-TFM approach discussed in relation to FIG. 2C.
Figure 3B:
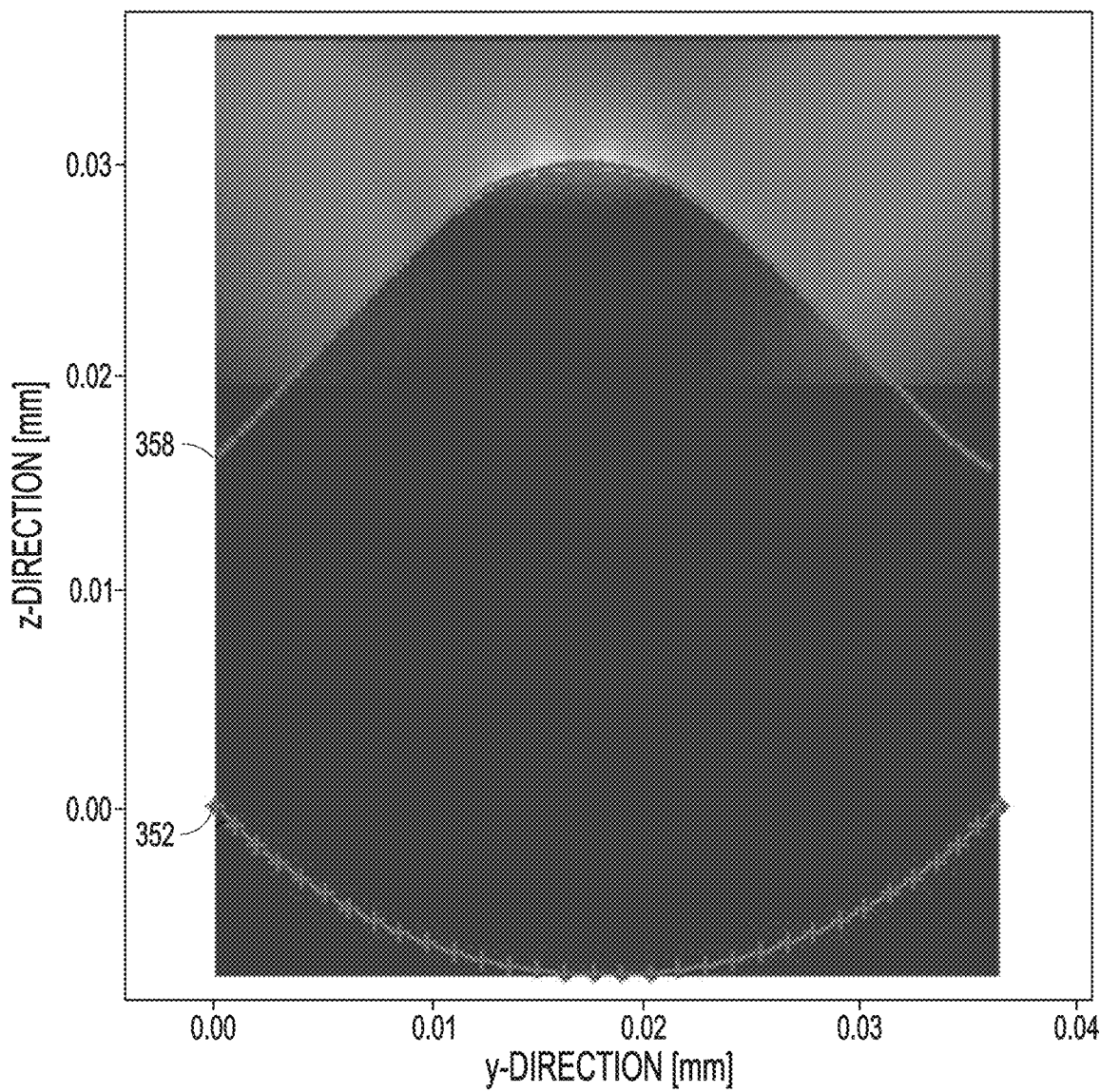
FIG. 3B illustrates generally an example comprising a level map encompassing a region within the structure under test that can be generated for normalizing or scaling received acoustic signals according to a physical focusing behavior of the transducer array, and such as can be applied as a portion of the PF-TFM approach discussed in relation to FIG. 2C.

FIG. 3A illustrates generally an example comprising an level map encompassing a region within the coupling medium that can be generated for normalizing or scaling received acoustic signals according to a physical focusing behavior or gain apodization applied to a transducer array 352, and such as can be applied as a portion of the PF-TFM approach discussed in relation to FIG. 2C. Gain apodization can redefine an electronic maximum or other extremum of imaging data output from a TFM summation when performing TFM imaging. A normalization or scaling approach can be performed, such as to identify a spatial map indicative of such redefinition. For example, in FIG. 3A, the TFM summation with the same gain apodization as would be applied for actual imaging can be fed a constant value for all samples (e.g., unity or some other value corresponding to a constant or "DC" offset). The result of such imaging using substitute representations (e.g., "dummy" constant values) are shown for the medium between in the transducer array 352 and the target in FIG. 3A (e.g., water), and in FIG. 39, a level map within the structure under test (e.g., target 358). The maps of FIG. 3A or FIG. 3B can be applied as a portion of the PF-TFM approach discussed in relation to FIG. 2C to normalize or otherwise compensate for gain apodization at each spatial location (e.g., pixel or voxel location) being imaged. The maps of FIG. 3A or FIG. 3B could also be presented to a user or stored to provide an indication of the spatial regions covered by the acoustic inspection approach. For example, regions having a higher relative level in the level map indicate enhanced coverage or sensitivity as compared to other regions.

Figure 4A:
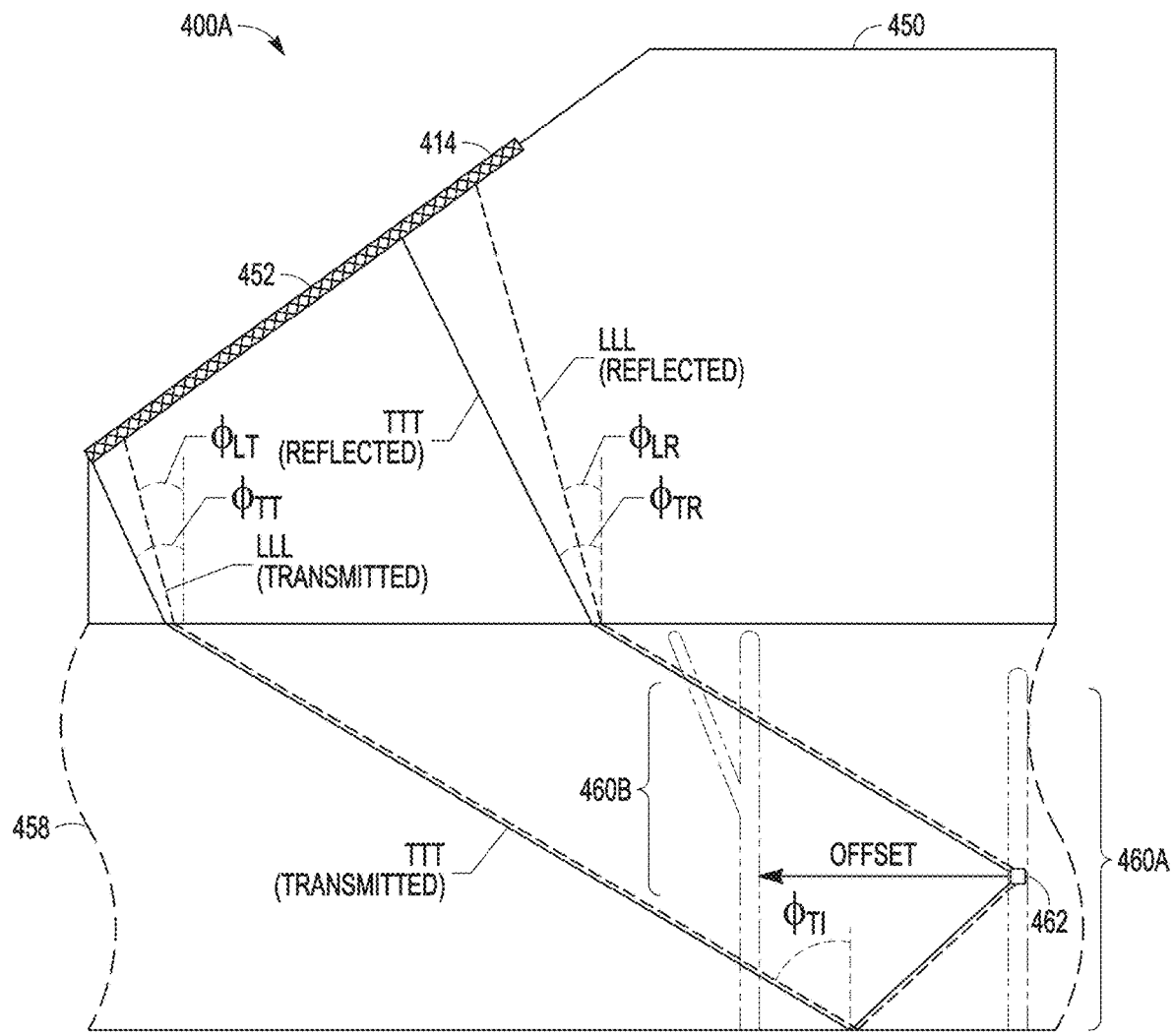
FIG. 4A illustrates generally an example comprising an acoustic inspection scheme that can be used to perform transmission and acquisition of acoustic signals for use with the PF-TFM approach.

FIG. 4A illustrates generally an example 400A comprising an acoustic inspection scheme that can be used to perform transmission and acquisition of acoustic signals for use with the PF-TFM approach. The example 400A includes an angle-beam inspection scheme using an acoustic transducer assembly 450, such as comprising a rigid wedge structure supporting a transducer array 452 including respective electroacoustic transducers (e.g., with a transducer 414 included in the array). A wall of a tubular structure or a plate can represent a target 458 being inspected, with the goal of revealing or otherwise characterizing a flaw region 460A. Angle-beam inspection can include use of various acoustic propagation modes, such as a transverse (T) or shear-wave propagation mode, and a longitudinal (L) mode.

The longitudinal mode and shear wave modes generally have different propagation velocities within the target 458. In the example 400A of FIG. 4A, a TTT scheme can include path segments as shown by the solid line (e.g., TTT transmitted, and TTT reflected), where "TTT" indicates that all three segments within the structure under test 458 are in the shear or transverse propagation mode. Similarly, an LLL scheme, shown by the dashed lines, shows acoustic propagation paths of longitudinal acoustic path segments, which overlay the TTT segments within the target 458.

The present inventors have recognized, among other things, that differences in propagation behavior can be used to provide angular-selective processing such as during TFM summation, to provide acoustic path filtering, as discussed above. In the example of FIG. 400A, even though the propagation paths of the TTT and LLL signals overlap within the structure 458 under test, such signals can be separated using angular-selective windowing on one or more of the transmit or receive paths. As shown in FIG. 4A, an angle of the receive axis of the longitudinal mode signal, ϕLR is different from the corresponding receive axis of the transverse mode signal ϕTR. Similarly, an angle of the transmit axis of the longitudinal mode signal ϕLT is different from the corresponding transmit axis of the transverse mode signal, ϕTT. Such filtering can also be performed at other interfaces, such as at the far surface of the target 458, such as depending on an angle of incidence ϕTI.

For non temporally-overlapping echo signals corresponding to different acoustic propagation modes, a time-gating approach can be used to suppress contributions from undesired modes. If no allowance is made for mode conversion or received echo signals corresponding to different acoustic propagation modes temporally overlap, artifacts can result in the corresponding TFM images. For example, as shown in FIG. 4A, the region 460B appears to be a separate flaw relative to the region 460A, but the region 460B is instead created by the shorter time-of-flight of the LLL mode, resulting in an image of the same flaw as shown at 460A, but in the wrong spatial location. As mentioned above, such artifacts may decrease productivity or raise alarm when reviewed by operating personnel, when in reality there is no flaw in region 460B. This can be referred to generally as a mode conversion artifact.

Returning to EQN. (1), the present inventors have recognized, among other things, that undesirable propagation modes can be filtered out to suppress their contribution to a pixel or voxel location (e.g., pixel or voxel 462 as shown in FIG. 4A).

$$W_{ni}(x,y,z) = W'_{ni} W_{ni-1} \qquad (4)$$

$$W_{mi}(x,y,z) = W'_{mi} W_{mi-1} \qquad (5)$$

Respective acoustic propagations paths from each transmit or receive element can be weighted such as using weighting functions as defined above in EQN. (4) and EQN. (5), such as accounting for each interface (e.g., material boundary) along the path to or from the pixel or voxel, with EQN. (4) and EQN. (5) corresponding to receive and transmit path-filtering weightings. For example, such weighting can be dependent on an incident angle of the acoustic propagation path at each of the interfaces and an angular-dependent weighting factor to enhance a desired propagation mode or suppress an undesired propagation mode. When several interfaces are on the acoustic path, as shown for the TTT and LLL, paths in FIG. 4A, the respective weights $W_{ni}$ and $W_{mi}$ for TFM summation can be applied, where $W'_{ni}$ and $W'_{mi}$ refer to a respective interface weights and where $W'_{i=0}$ can be set to 1 or alternatively provide element directivity apodization (as discussed above generally in relation to FIG. 2A). The weighting functions can be selected in part using information about an echo transmittance for a particular inspection scheme.

Figure 4B:
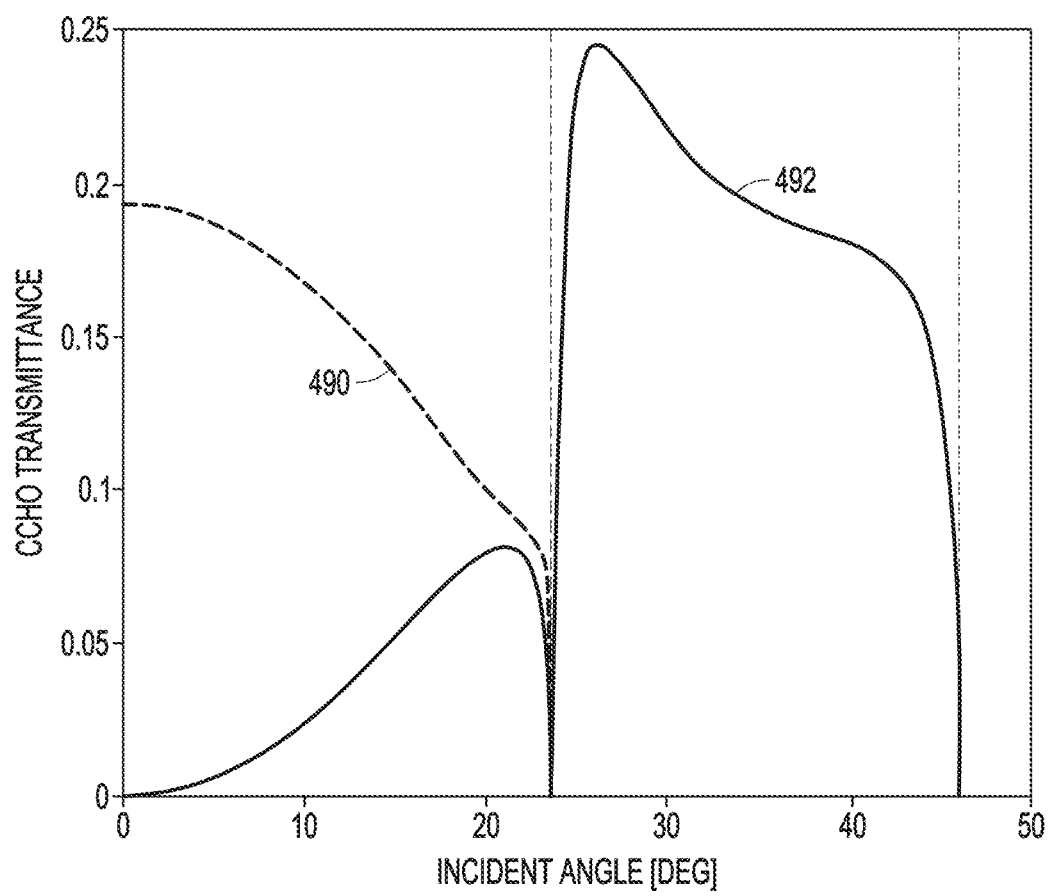
FIG. 4B illustrates generally an example comprising plots of echo transmittance for different acoustic propagation modes as a function of incident angle, such as can be used to inform a path-filtering approach.

For example, FIG. 4B illustrates generally an example comprising plots of echo transmittance for different acoustic propagation modes as a function of incident angle, such as can be used to inform a path-filtering approach. The plots in FIG. 4B illustrate echo transmittance for a round trip (pulse-echo) pressure back at the transducer in a Rexolite® ($v_L$=2330 meters per second (m/s)) to steel ($v_L$=5800 m/s, $v_T$=3240 m/s) interface as a function of the incident angle on the steel interface from the Rexolite® wedge structure. The left dashed line represents the L-wave critical angle and the right dashed line represents the T-wave critical angle. As an illustrative example, a binary weighting scheme ("brick wall") shape can be used, such as to suppress or block all L-wave 490 contributions to TFM summation and to pass at least most of the T-wave contribution 492. A brick-wall approach could set to zero contributions from acoustic propagation paths having incident angles lesser in magnitude than about 23.7 degrees and greater in magnitude than about 46 degrees, and the angular filter could set to unity (e.g., pass) the contributions from acoustic propagation paths within the range of about 23.7 degrees to about 46 degrees. In this manner, the transverse propagation mode (TTT) is selected and the longitudinal mode contribution is suppressed. Such an approach has been shown experimentally to suppress artifacts such as shown in the region 460B of FIG. 4A.

Figure 5A:
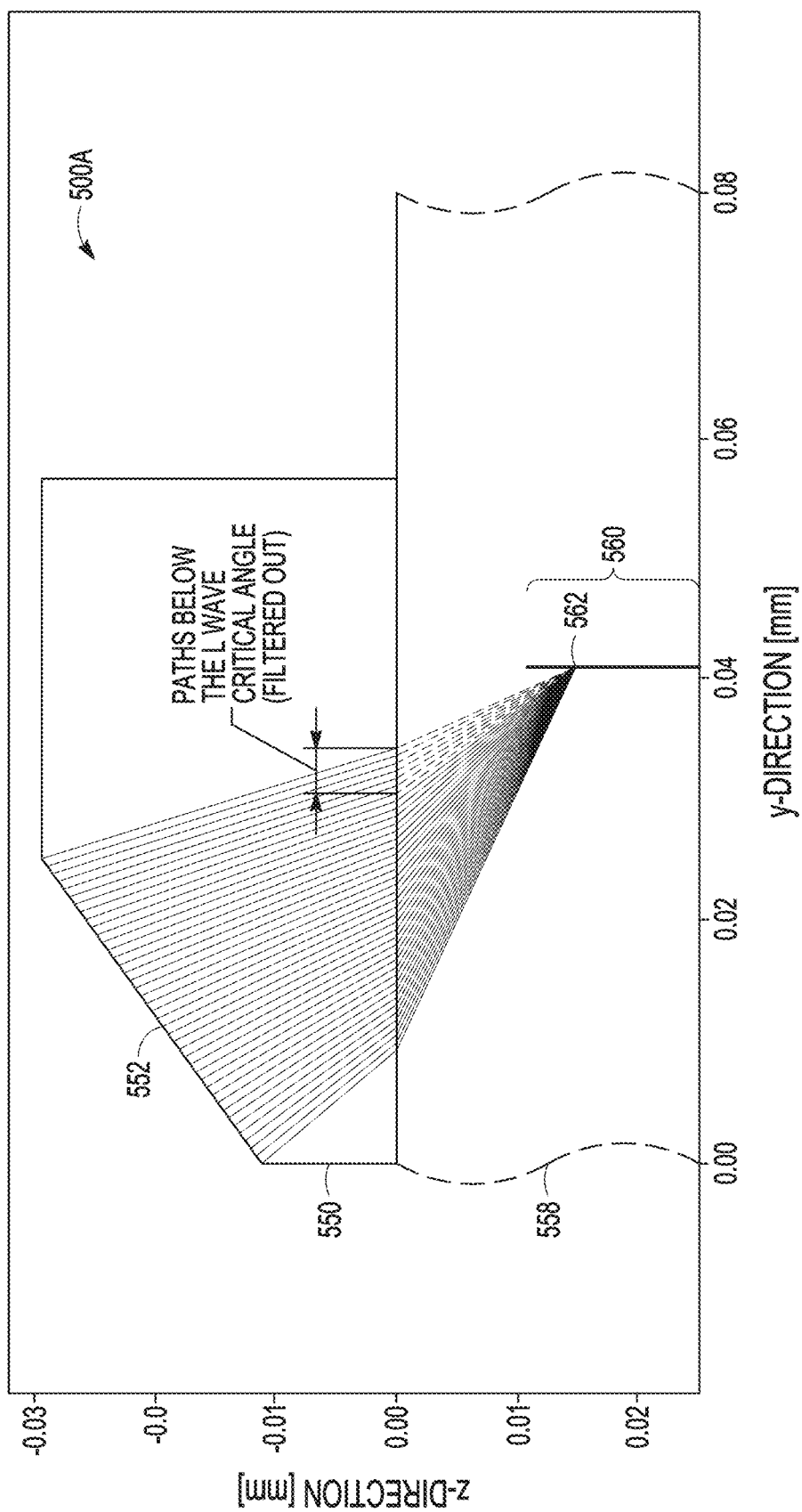
FIG. 5A illustrates generally a representation of acoustic propagation paths in the receive direction from specified pixel or voxel location, including a range of acoustic paths that can be suppressed by application of a PF-TFM approach as described herein.
Figure 5B:
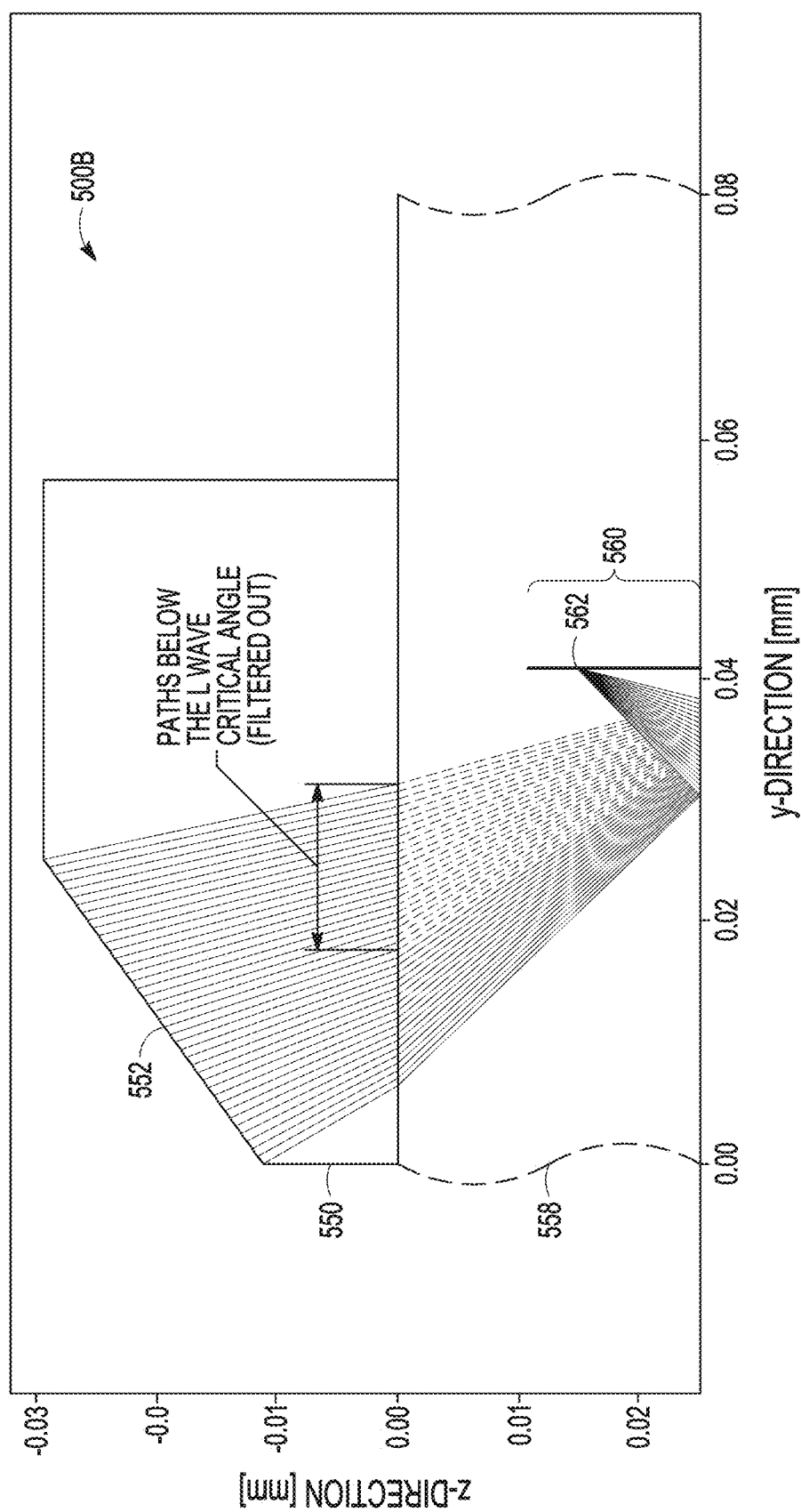
FIG. 5B illustrates generally a representation of acoustic propagation paths in the transmit direction from specified pixel or voxel location, including a range of acoustic paths that can be suppressed by application of a PF-TFM approach as described herein.

FIG. 5A illustrates generally a representation 500A of acoustic propagation paths in the receive direction from a specified pixel or voxel location 562, including a range of acoustic paths that can be suppressed by application of a PF-TFM approach as described herein. FIG. 5A provides a graphical representation of receive acoustic paths defined as rays cast from pixel or voxel location 562 to respective receive transducer elements included as a portion of the transducer array 552 supported by the transducer assembly 550. For example, the bulk of the transducer assembly 550 can be Rexolite® or another material, at the target 558 can be steel, with a flaw in the region 560 being imaged using a PF-TFM approach. Receive paths defined as having an angle lesser in magnitude than the L-wave critical angle can be suppressed from contributing to the TFM summation for the pixel or voxel location 562. Similarly, referring to FIG. 5B, transmit paths from respective ones of the transducer elements in the array 552 can cast rays defining acoustic propagation paths to the specified pixel or voxel 562 including a reflection from the far surface of the target 558. Transmit acoustic paths in the range lesser than the L-wave critical angle can be suppressed from contributing to the TFM summation for the pixel or voxel location 562. The combination of the receive path filtering of FIG. 5A and transmit path filtering of FIG. 5B can be used for a self-tandem TTT imaging mode, as an illustrative example.

Figure 6A:
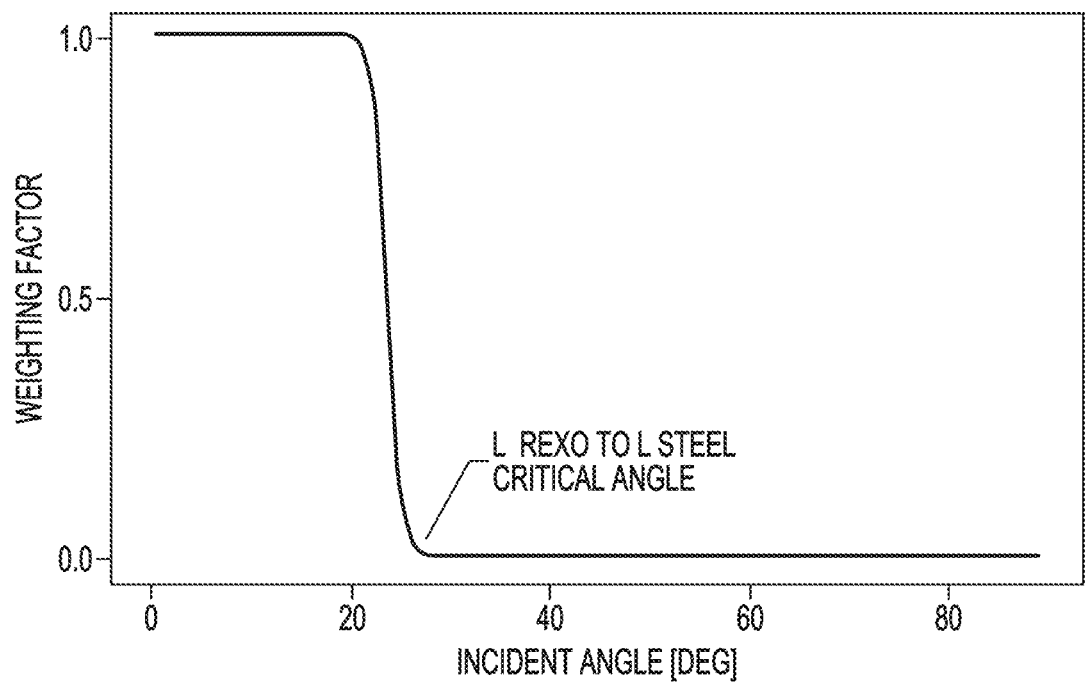
FIG. 6A, FIG. 6B, FIG. 6C, FIG. 6D, FIG. 6E, and FIG. 6F illustrate generally respective illustrative examples of a gain modulation "windows" (e.g., apodization windows) that can be applied to acoustic paths to provide path filtering in a PF-TFM approach as described herein.

FIG. 6A, FIG. 6B, FIG. 6C, FIG. 6D, FIG. 6E, and FIG. 6F illustrate generally respective illustrative examples of a gain modulation "windows" (e.g., apodization windows) that can be applied to acoustic paths to provide path filtering in a PF-TFM approach as described herein. As mentioned above, different angular-dependent weighting functions or gain modulation windows can be applied during TFM summation (e.g., during coherent summation to provide a value for a particular pixel or voxel location). The weighting functions can be specified to provide desired mode selectivity, and in dependence on the materials comprising the interface. For example, FIG. 6A provides an illustrative example of an angular-dependent window shape that can allow contributions in the TFM sum of an L-wave from Rexolite® propagating to an L-wave mode in steel.

Figure 6B:
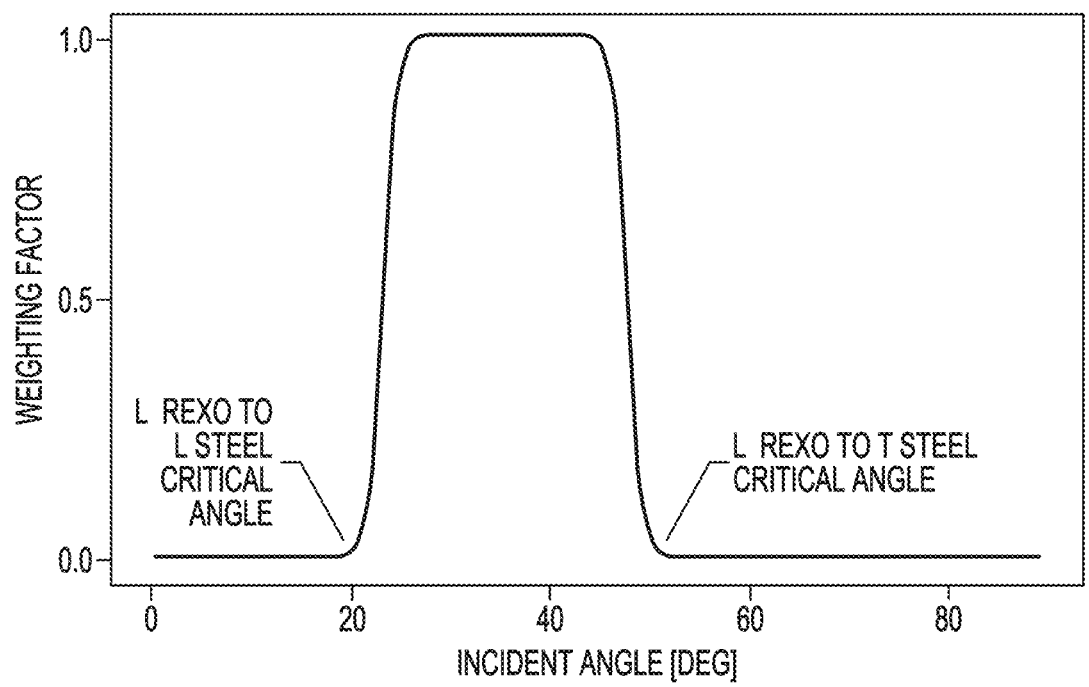

FIG. 6B provides an illustrative example of an angular-dependent window shape that can allow contributions in the TFM sum of an L-wave from Rexolite® propagating to a T-wave mode in steel.

Figure 6C:
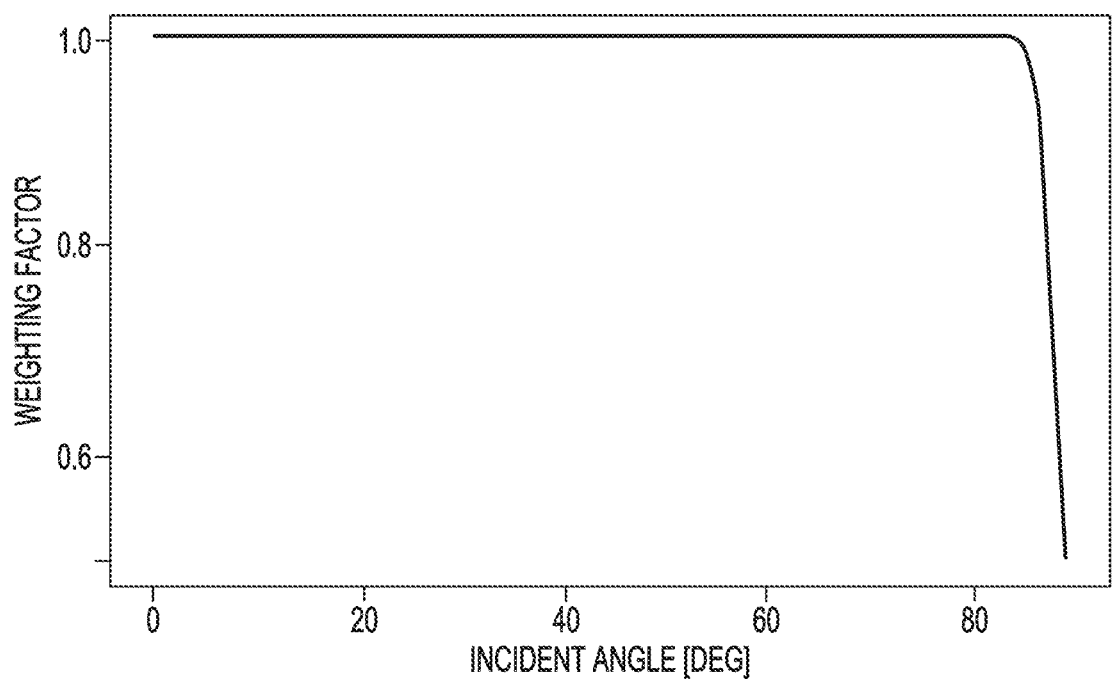

FIG. 6C provides an illustrative example of an angular-dependent window shape that can allow contributions in the TFM sum of reflection from an L-wave mode in steel to an L-wave mode in steel.

Figure 6D:
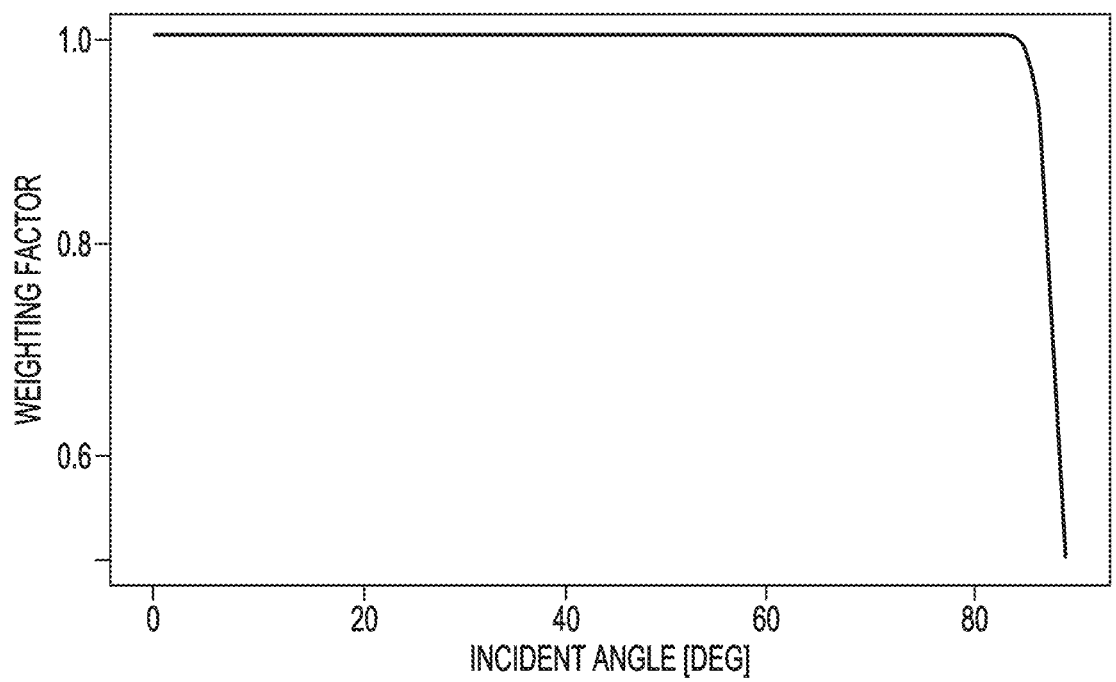

FIG. 6D provides an illustrative example of an angular-dependent window shape that can allow contributions in the TFM sum of reflection from an L-wave mode in steel to a T-wave mode in steel.

Figure 6E:
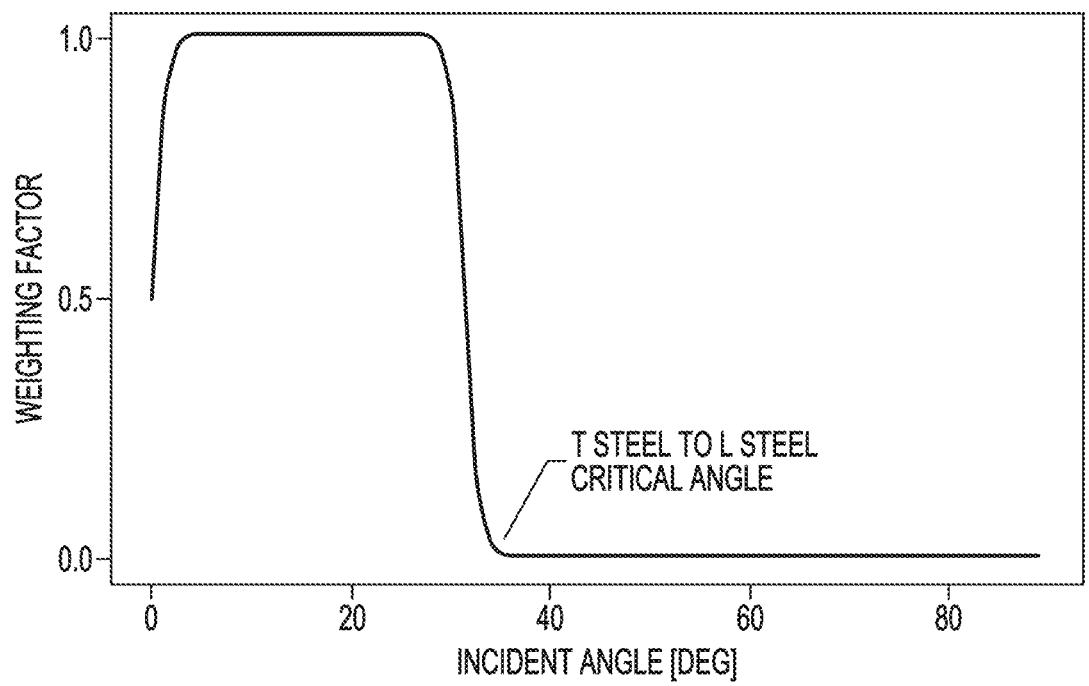

FIG. 6E provides an illustrative example of an angular-dependent window shape that can allow contributions in the TFM sum of reflection from a T-wave mode in steel to an L-wave mode in steel.

Figure 6F:
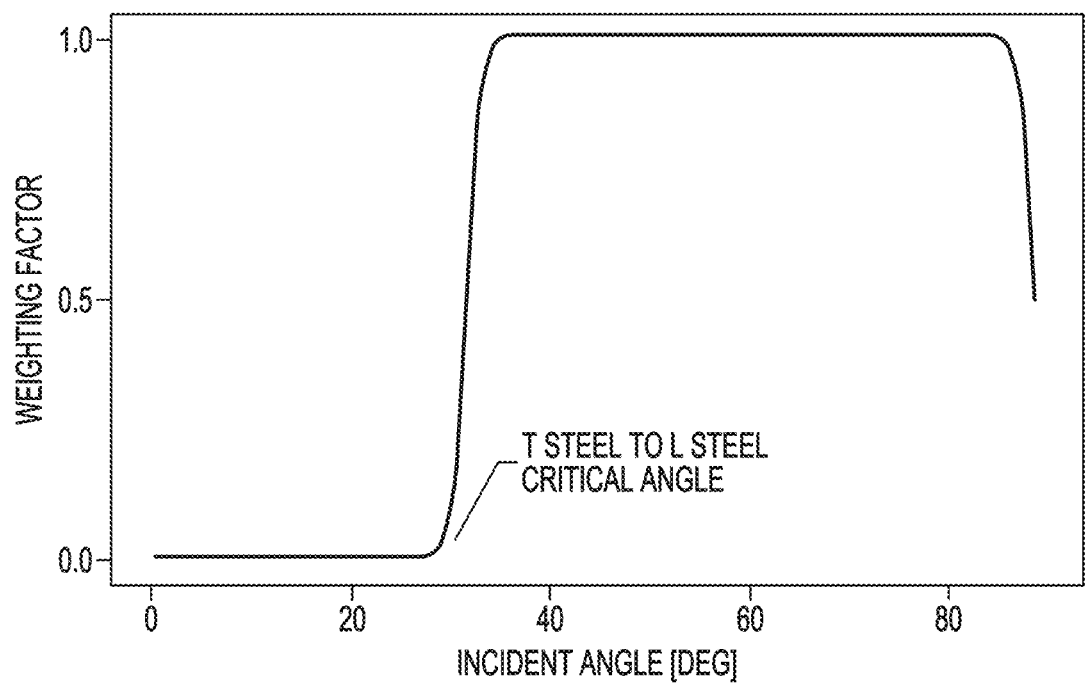

FIG. 6F provides an illustrative example of an angular-dependent window shape that can allow contributions in the TFM sum of reflection from a T-wave mode in steel to a T-wave mode in steel.

Generally, FIG. 6A through FIG. 6F illustrate how different angular-dependent window shapes can be selected to achieve PF-TFM imaging using the desired mode combination in a mode-selective manner. Such path filtering can include filtering based on an angle of incidence at a far surface ($\phi TI$) of the target 458 as shown in FIG. 4A, such as using one or more of the window shapes shown in FIG. 6C, FIG. 6D, FIG. 6E, or FIG. 6F. As an illustrative example, in a TT-T (e.g., self-tandem) imaging configuration, the window shape of FIG. 6F can be used to restrict contributions to the TFM to primarily T-wave propagation after the far-wall reflection, suppressing L-wave propagation (and blocking a contribution from T-to-L-wave mode conversion).

Figure 7A:
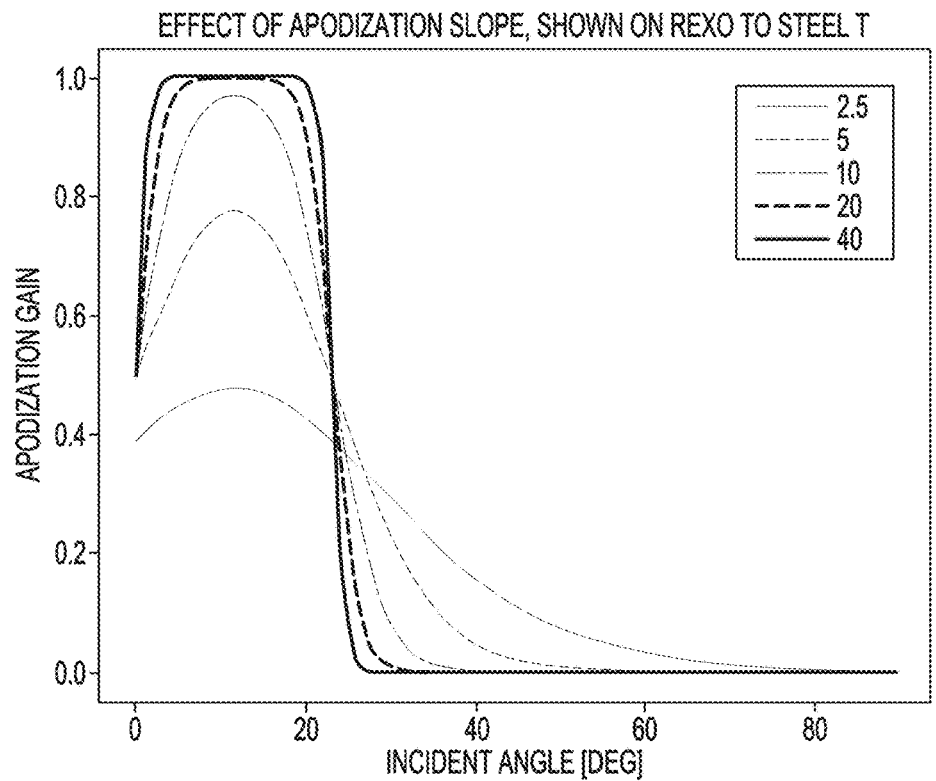
FIG. 7A illustrates generally an illustrative example of an analytical function that can be used to generate a gain modulation window, including providing an adjustable shape.

FIG. 7A illustrates generally an illustrative example of an analytical function that can be used to generate a gain modulation window, including providing an adjustable shape. For weld inspection, for example, such as could be performed using the angle-beam scheme in the examples above, a configurable window may be desired. The configurable window can have a shape that can be selected, such as defined by an analytical function. In FIG. 7A, a slope or shape of the apodization window can be modulated, such as for use in Rexolite®-to-steel transmission to preserve a longitudinal mode contribution in the TEM summation. The analytical function describing the gain modulation window is shown below in EQN. (6):

$$\text{Gain} = \tfrac{1}{2}(\tanh((\alpha-\beta_{Min})*\gamma) - \tanh((\alpha-\beta_{Max})*\gamma)) \qquad (6)$$

In EQN. (6), "βMin" and "βMax" define lower and upper angular cut-off values, "α" resents the incident angle, and "γ" represents a slope factor. The various curves shown in FIG. 7A correspond to different slope factor values. A trade-off may exist between the steepness of the cut-off characteristic and the resolution provided during imaging, with a softer (more gradual) roll-off providing a wider imaging aperture at the cost of poorer performance in suppression of unwanted modes.

The techniques described in this document were experimentally evaluated using an Olympus 5L32-A32 transducer coupled to a an SA32-N55S wedge (both available from Olympus Scientific Solutions America Corp, Waltham, Mass., USA), where the target was a 25 mm thick steel plate including a vertical natural crack from the bottom of the part up to 68% of the thickness. A reference index offset distance is 9 mm from the crack position to the tip of the wedge. Pixel values corresponding to flaw locations were used to determine signal-to-noise ratios from imaging data obtained experimentally and results are summarized below in Table 1:

TABLE 1

PF-TFM performance over non-PF TFM

|  | T-wave only modes (TT, TT-TT, TT-T) | LL-T Mode |
|---|---|---|
| Median flaw signal loss (dB) | 0.8 | 4.3 |
| Median SNR Increase (dB) | 23.3 | 8.5 |
| Min, SNR increase (dB) | 6.1 | 0.8 |

The PF-TFM approach showed significant SNR enhancement in T-wave only modes, achieving dramatic SNR improvement (median 23.3 dB) and low impact on the flaw signal on interest (the maximum recorded loss on the flaw is 5.6 dB on the crack tip at a minus-40 mm probe position). In the LL-T mode, there is flaw signal amplitude loss, but still a median 8.5 dB SNR improvement. Without being bound by theory, it is believed that the performance of the LL-T mode is impacted by overlapping presence of L-wave and T-wave energy in certain angular ranges, such as below the critical angle.

Figure 7B:
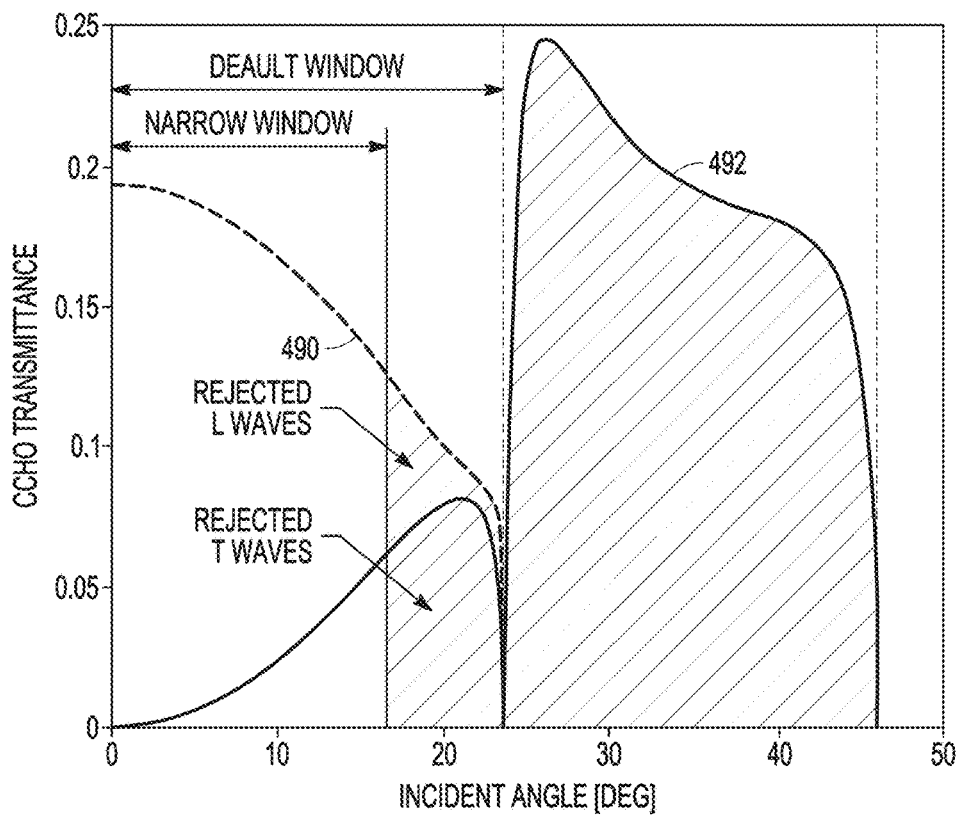
FIG. 7B illustrates generally an illustrative example of adjustable selection of a "cut-off" angle in application of a gain modulation window, such as to enhance suppression of a contribution from a transverse mode at the expense of some degree of sensitivity to a signal propagating in the longitudinal mode.
Figure 7C:
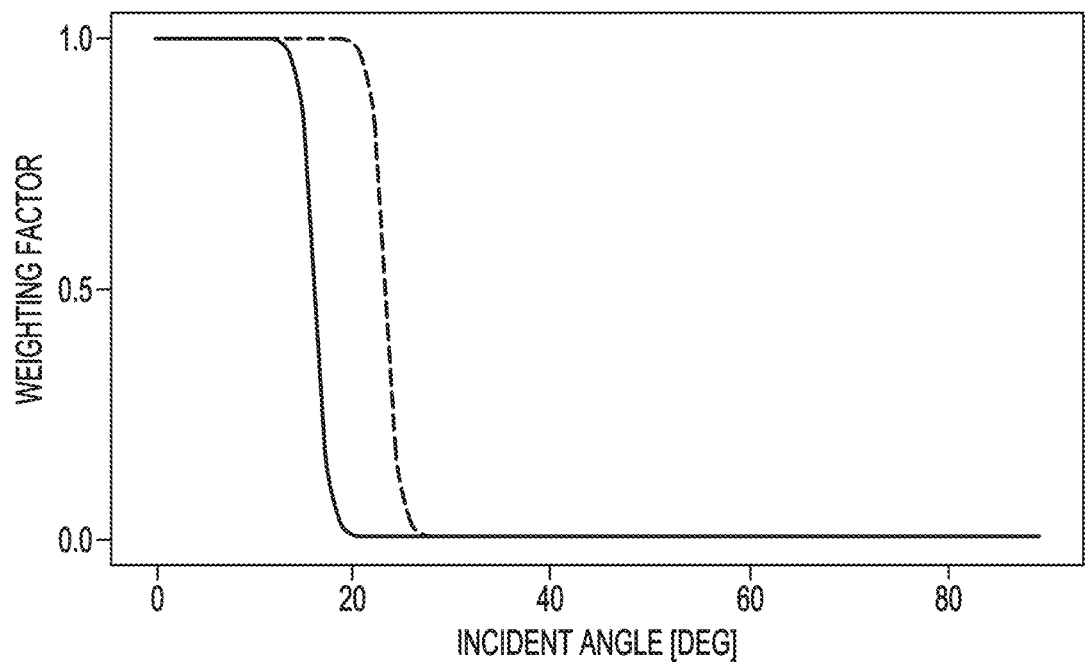
FIG. 7C illustrates generally an illustrative example of different gain modulation windows, including a narrower angular window to provide the mode suppression mentioned in relation to FIG. 7B.

This overlap is shown graphically in FIG. 7B, with the L-wave echo transmittance 490 shown overlapping with the T-wave echo transmittance 492. In FIG. 7B, a cut-off angle can be modified from an initial or default window allowing angles from zero to 23.7 degrees to a narrowed window, such as can be applied for LL-T imaging where mode conversion is desired. Gain modulation functions for performing such narrowed weighting versus default weighting are shown illustratively in FIG. 7C, where the dashed line illustrates the original cut-off angular range, and the solid line shows the narrowed cut-off angular range that can be used for enhanced LL-T imaging. This technique was used to provide the experimentally-obtained LL-T results in Table 1.

Figure 8:
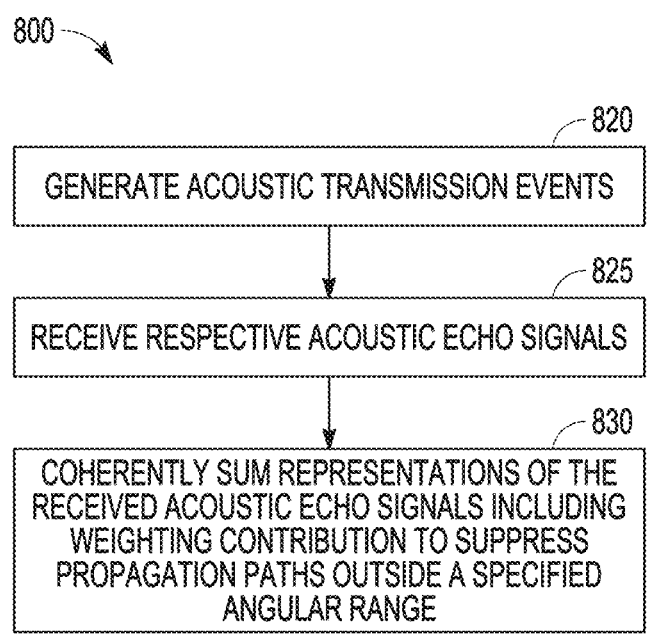
FIG. 8 illustrates generally a technique, such as a method, to perform a PF-TFM approach as described herein.

FIG. 8 illustrates generally a technique 800, such as a method, to perform a PF-TFM approach as described herein. At 820, acoustic transmission events can be generated. For example, respective acoustic transducer elements can be energized, such as one-at-a-time to define each transmission event. In response, such as for each acoustic transmission event, at 825, acoustic echo signals can be received. The acoustic echo signals can be scattered or reflected from features on or within a target being inspected. A matrix of time-series data can be acquired, such as to provide a full-matrix capture (FMC) acquisition scheme. At 830, representations of the received acoustic echo signals can be coherently summed, such as a portion of a total-focusing method (TFM) technique for generation of imaging data for presentation to a user. Such representations for coherent summation can include selected samples corresponding to a specified pixel or voxel location as shown and described above. One or more weighting functions can be applied, such as weighting contributions to suppress contributions from acoustic propagation paths outside a specified angular range. The specified angular range can be defined with respect to a target, such as with respect to a surface of the target.

In the examples in this document, the gain apodization windows that can be used for path filtering (e.g., weighting contributions according to their acoustic paths) are described in various ways, including as analytical functions or graphical representations. In various implementations, such functions can be represented as analytical expressions or numerical representations, such as stored in an array, look-up table, or other data structure, for application during TFM summation. The techniques shown and described in this document can be performed using a portion or an entirety of an inspection system 100 as shown in FIG. 1 or otherwise using a machine 900 as discussed below in relation to FIG. 9.

Figure 9:
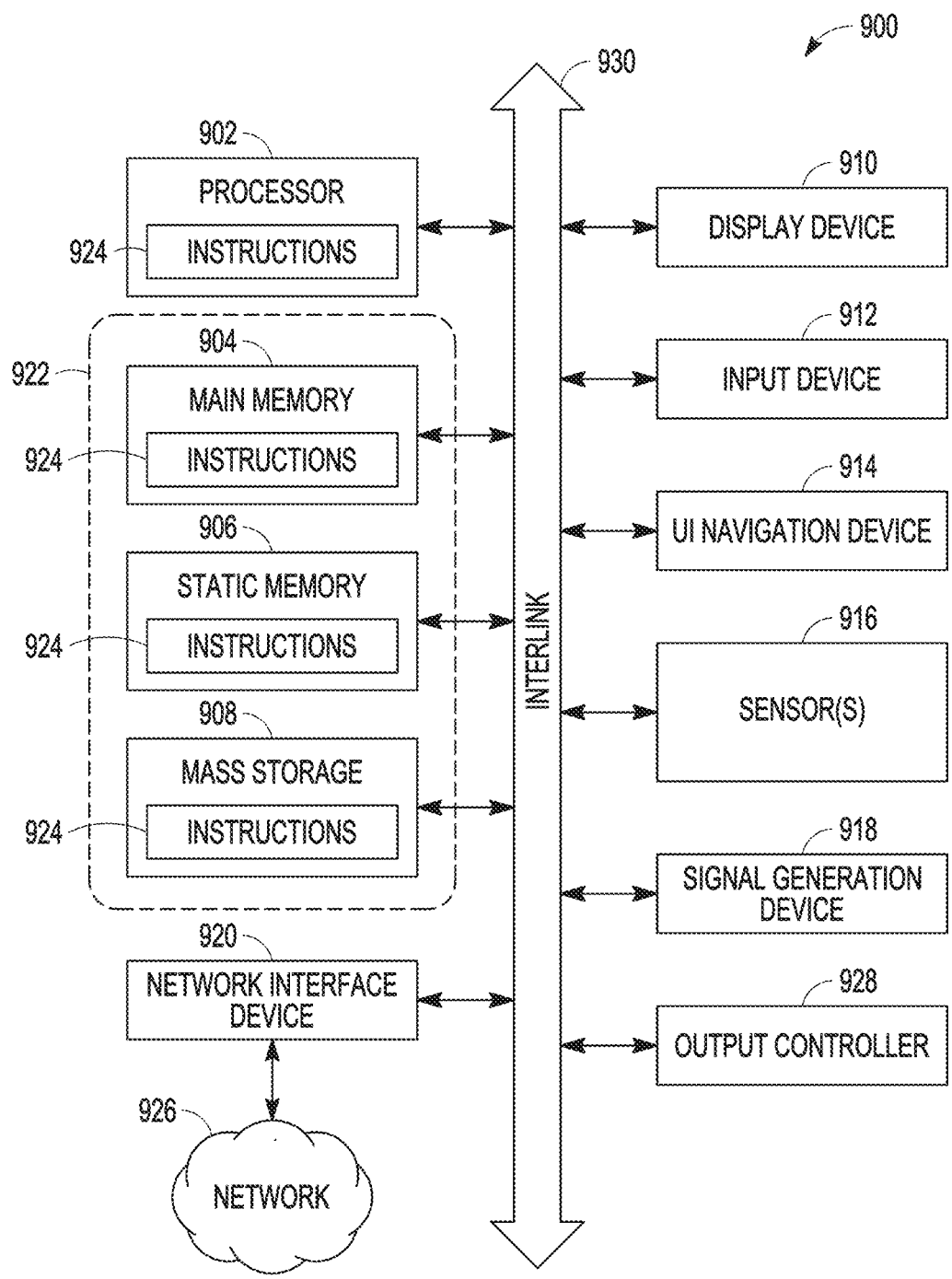
FIG. 9 illustrates a block diagram of an example comprising a machine upon which any one or more of the techniques (e.g., methodologies) discussed herein may be performed.

FIG. 9 illustrates a block diagram of an example comprising a machine 900 upon which any one or more of the techniques (e.g., methodologies) discussed herein may be performed. In various examples, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIM), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Various Notes

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

The claimed invention is:

1. An automated method for acoustic evaluation of a target, the method comprising:
generating respective acoustic transmission events via selected transmitting ones of a plurality of electroacoustic transducers;
in response to the respective acoustic transmission events, receiving respective acoustic echo signals using other receiving ones of the plurality of electroacoustic transducers; and
coherently summing representations of the respective received acoustic echo signals to generate a pixel or voxel value corresponding to a specified spatial location of the target, including weighting contributions from the respective representations to suppress contributions from acoustic propagation paths outside a specified angular range with respect to a surface on or within the target.

2. The automated method of claim 1, wherein the weighting contributions from the respective representations to suppress contributions from acoustic propagation paths outside the specified angular range includes defining the specified angular range relative to an axis that is one of normal or tangent to the surface on or within the target.

3. The automated method of claim 1, wherein a representation of the surface on or within the target is provided as a hypothetical target representation; and
wherein the specified angular range is determined from the hypothetical target representation.

4. The automated method of claim 1, comprising determining the representation of the surface on or within the target, the determining the representation comprising:
coherently summing representations of the respective received acoustic echo signals;
detecting an edge corresponding to the surface on or within the target; and
wherein the specified angular range is determined at least in part using the detected edge.

5. The automated method of claim 1, wherein weighting contributions from the respective representations comprises determining an angular relationship between a propagation axis and an axis perpendicular or tangent to the surface on or within the target and applying a weighting function based on the angular relationship.

6. The automated method of claim 5, wherein the weighting is represented as a window function providing a value that is dependent on the angular relationship.

7. The automated method of claim 6, wherein the weighting the contributions comprises suppressing contributions corresponding to an undesired acoustic propagation mode within a medium defined by the target, or enhancing a contribution corresponding to a specified acoustic propagation mode within the medium, including applying a corresponding window function providing a value that is dependent on the angular relationship.

8. The automated method of claim 5, wherein the propagation axis defines at least one of a transmit axis or a receive axis.

9. The automated method of claim 8, wherein the transmit axis is defined as a line extending from the specified spatial location of the pixel or voxel to a corresponding transmitting transducer.

10. The automated method of claim 8, wherein the receive axis is defined as a line extending from the specified spatial location of the pixel or voxel to a corresponding receiving transducer.

11. The automated method of claim 1, comprising normalizing respective pixel or voxel value determinations.

12. The automated method of claim 11, wherein the normalizing comprises:
determining a map of signal level values using substitute representations for the respective received acoustic transmissions; and
scaling a respective pixel or voxel value using a signal level value from a corresponding location in the map.

13. The automated method of claim 1, wherein the target comprises a composite material.

14. The automated method of claim 13, wherein the surface comprises a convex curved surface facing the plurality of electroacoustic transducers.

15. The automated method of claim 1, wherein the weighting contributions comprises at least one of: suppressing contributions corresponding to an undesired acoustic propagation mode within a medium defined by the target, or enhancing a contribution corresponding to a specified acoustic propagation mode within the medium.

16. The automated method of claim 15, comprising suppressing contributions corresponding to an undesired acoustic propagation mode within the medium by at least one: of time-gating respective received acoustic echo signals, or by removing or attenuating or ignoring respective durations of the representation of the received respective acoustic echo signals corresponding to the undesired acoustic propagation mode.

17. An ultrasonic inspection system, comprising:
a processor circuit; and
a memory circuit comprising instructions that, when executed by the processor circuit, cause the system to:
generate respective acoustic transmission events via selected transmitting ones of a plurality of electroacoustic transducers;
in response to the respective acoustic transmission events, receive respective acoustic echo signals using other receiving ones of the plurality of electroacoustic transducers;
coherently sum representations of the respective received acoustic echo signals to generate a pixel or voxel value corresponding to a specified spatial location of the target, including weighting contributions from the respective representations to suppress contributions from acoustic propagation paths outside a specified angular range with respect to a surface on or within the target;
generate an image using a plurality of pixel or voxel values corresponding to respective specified spatial locations of the target; and
transmit or present the generated image to a user.

18. The ultrasonic inspection system of claim 17, wherein the instructions to weight contributions from the respective representations to suppress contributions from acoustic propagation paths outside the specified angular range includes defining the specified angular range relative to an axis that is one of normal or tangent to the surface on or within in the target.

19. An ultrasonic inspection system, comprising:
a means for generating respective acoustic transmission events;
a means for receiving respective acoustic echo signals, in response to the respective acoustic transmission events;
a means for coherently summing representations of the respective received acoustic echo signals to generate a pixel or voxel value corresponding to a specified spatial location of the target, including weighting contributions from the respective representations to suppress contributions from acoustic propagation paths outside a specified angular range with respect to a surface on or within the target;
a means for generating an image using a plurality of pixel or voxel values corresponding to respective specified spatial locations of the target; and
a means for transmitting or presenting the generated image to a user.

20. The ultrasonic inspection system of claim 19, wherein the means for coherently summing representations includes weighting contributions from the respective representations to suppress contributions from acoustic propagation paths outside the specified angular range by defining the specified angular range relative to an axis that is one of normal or tangent to the surface on or within in the target.

* * * * *